United States Patent
Guo et al.

(10) Patent No.: US 12,158,599 B2
(45) Date of Patent: Dec. 3, 2024

(54) MULTILAYER OPTICAL FILMS, ENABLED STRUCTURAL COLOR, STRUCTURAL COLORED PIGMENT, AND METHOD OF PREPARING THE SAME

(71) Applicant: NINGBO INLIGHT TECHNOLOGY CO., LTD., Ningbo (CN)

(72) Inventors: Lingjie Jay Guo, Ann Arbor, MI (US); Daoyuan Ma, Ningbo (CN)

(73) Assignee: NINGBO INLIGHT TECHNOLOGY CO., LTD., Ningbo (CN)

( * ) Notice: Subject to any disclaimer, the term of this patent is extended or adjusted under 35 U.S.C. 154(b) by 956 days.

(21) Appl. No.: 17/033,804

(22) Filed: Sep. 27, 2020

(65) Prior Publication Data
US 2021/0096289 A1    Apr. 1, 2021

(30) Foreign Application Priority Data
Sep. 27, 2019   (CN) .......................... 201910926160.1

(51) Int. Cl.
*G02B 5/28*    (2006.01)
*C09C 1/00*    (2006.01)
(Continued)

(52) U.S. Cl.
CPC ............ *G02B 5/285* (2013.01); *C09C 1/0024* (2013.01); *C09J 11/04* (2013.01); *C09J 163/00* (2013.01);
(Continued)

(58) Field of Classification Search
CPC .......... G02B 5/285; G02B 5/26; G02B 5/286; G02B 5/288; G02B 1/10; G02B 5/28;
(Continued)

(56) References Cited

U.S. PATENT DOCUMENTS 8,593,728 B2 †   11/2013   Banerjee
2003/0039836 A1*  2/2003   Pfaff ....................... A61Q 1/02
                                                        428/404
(Continued)

FOREIGN PATENT DOCUMENTS

CA    2463373 A1    7/2003
CN    1604845 A     4/2005
(Continued)

OTHER PUBLICATIONS

Chinese first office action, Chinese Application No. 201910926160. 1, mailed Apr. 30, 2020 (19 pages).
(Continued)

*Primary Examiner* — Darryl J Collins
*Assistant Examiner* — Matthew Y Lee (57) ABSTRACT

The present disclosure provides an optical film, a structural colored pigment, and a method for preparing an optical film. The optical film includes a multilayer film. The multilayer film includes films with high refractive indexes and films with low refractive indexes alternately arranged in a multilayer manner, and a middle film. Some of the films with the high refractive indexes and some of the films with the low refractive indexes are disposed on a side of the middle film, constituting first other films. Optical thicknesses of films having a same refractive index in the optical films and an optical thickness of the middle film are all different or partially different.

16 Claims, 3 Drawing Sheets

(51) Int. Cl.
*C09J 11/04* (2006.01)
*C09J 163/00* (2006.01)

(52) U.S. Cl.
CPC ............... *C09C 2200/1037* (2013.01); *C09C 2200/302* (2013.01); *C09C 2200/303* (2013.01); *C09C 2210/20* (2013.01)

(58) Field of Classification Search
CPC ............... G02B 1/115; C09C 1/0024; C09C 2200/1037; C09C 2200/302; C09C 2200/303; C09C 2210/20; C09C 1/0039; C09C 1/0051; C09C 1/0066; C09C 2210/10; C09C 1/0015; C09C 1/0078; C09C 1/0081; C09C 1/36; C09C 1/62; C09J 11/04; C09J 163/00; C01P 2002/84; C01P 2006/60; C01P 2006/66; B32B 7/023; G02C 7/107; G02C 7/108
See application file for complete search history.

(56) References Cited

U.S. PATENT DOCUMENTS

| | | | |
|---|---|---|---|
| 2003/0129404 A1* | 7/2003 | Argoitia | C09D 5/36 428/457 |
| 2005/0132929 A1 | 6/2005 | Raksha et al. | |
| 2010/0208338 A1* | 8/2010 | Banerjee | G02B 5/208 359/359 |
| 2013/0107368 A1 | 5/2013 | Delst et al. | |
| 2017/0248746 A1 | 8/2017 | Banerjee et al. | |
| 2019/0283070 A1 | 9/2019 | Argoitia et al. | |
| 2019/0285785 A1* | 9/2019 | Ockenfuss | G02B 5/285 |

FOREIGN PATENT DOCUMENTS

| | | | |
|---|---|---|---|
| CN | 1637078 | A | 7/2005 |
| CN | 101160360 | A | 4/2008 |
| CN | 103102728 | A | 5/2013 |
| CN | 109343215 | A | 2/2019 |
| CN | 109600462 | A | 4/2019 |
| EP | 1544255 | A2 | 6/2005 |
| EP | 2586834 | A1 | 5/2013 |
| JP | H11323182 | A | 11/1999 |
| JP | 2005513207 | A | 5/2005 |
| JP | 2005248158 | A | 9/2005 |
| JP | 2015105403 | A | 6/2015 |
| KR | 20050062458 | A | 6/2005 |
| TW | 567343 | B | 12/2003 |
| TW | 200525171 | A | 8/2005 |
| WO | WO03053674 | A1 | 7/2003 |
| WO | WO2003102084 | A1 | 12/2003 |

OTHER PUBLICATIONS

Notification to Grant Patent Right for Invention,Chinese Application No. 201910926160.1, mailed Jul. 20, 2020 (6 pages).
Notice of Reasons for Refusal, Japanese Application No. 2020-152310, mailed Aug. 3, 2021 (12 pages).
Notice of Reasons for Refusal, Japanese Application No. 2020-152310, mailed Mar. 15, 2022 (17 pages).
Decision of Dismissal of Refusal,I Japanese Application No. 2020-152310, mailed Sep. 6, 2022(4 pages).
Decision of Dismissal of Amendment, Japanese Application No. 2020-152310,mailed Sep. 6, 2022(4 pages).
Japanese Notice of Reasons for Refusal,Japanese Patent Application No. 2020-152310, mailed Mar. 5, 2024(10 pages).
Japanese Fourth Notice of Reasons for Refusal,Japanese Patent Application No. 2022-021394 ,mailed Jun. 18, 2024 (12 pages).

\* cited by examiner
† cited by third party

FIG. 1

An optical film is formed on a substrate, wherein the optical film includes a multilayer film in which films with high refractive indexes and films with low refractive indexes are alternately arranged in a multilayer structure. The multilayer film includes a middle film. Other films refer to a combination of films disposed on a side of the middle film. The optical thicknesses of the films having a same refractive index in the other films and the optical thickness of the middle film may be different or not be exactly the same.

MULTILAYER OPTICAL FILMS, ENABLED STRUCTURAL COLOR, STRUCTURAL COLORED PIGMENT, AND METHOD OF PREPARING THE SAME

CROSS REFERENCE TO RELATED APPLICATIONS

The present disclosure claims foreign priority of Chinese Patent Applications No. 201910926160.1, filed on Sep. 27, 2019 in the State Intellectual Property Office of China, the entire contents of which are hereby incorporated by reference.

TECHNICAL FIELD

The present disclosure relates to the technical field of optical films, and particularly to an optical film, an enabled based structural color, a structural colored pigment, and a method for preparing an optical film.

BACKGROUND

Structural color, also known as physical color, is produced by interference, resonance, diffraction, or scattering when light interacts with wavelength or sub-wavelength structures. Structural colored pigments, as a new generation of pigments, have a number of important advantages such as high brightness, high color saturation, non-toxic, non-fading, high temperature resistance, and environmental friendly, etc.

However, many of the existing structural colored pigments have a problem of low brightness.

SUMMARY OF THE DISCLOSURE

The primary technical problem solved by the present disclosure is to provide an optical film, a structural colored pigment, and a method for preparing an optical film, to improve the brightness of the optical film and achieve a reflectance R greater than 80%.

The present disclosure provides an optical film, configured to form a structural colored pigment and including: a multilayer film, including a plurality of first films with a first refractive index and a plurality of second films with a second refractive index alternately arranged in a multilayer structure, wherein the multilayer film further includes a middle layer film (which may be simplified as middle film); wherein films disposed at a same side of the middle film with a same refractive index have optical thicknesses that are all different or partially different.

In order to solve the above technical problem, another technical solution adopted in the present disclosure is to provide a structured color pigment, the structured color pigment is a fragment of the optical film described in any of the above embodiments, and the number of film layers of each of the fragments and the number of all the film layers in the optical film are the same; optical properties of the film layers of each of the fragments are the same as optical properties of the optical film.

In some embodiments, the optical thicknesses of the films disposed at the same side of the middle film with the same refractive index, are all different with each other; and/or, a difference between the first refractive index and the second refractive index is equal to or greater than 0.2.

In some embodiments, the multilayer film includes a first group consisted of some of the first films with the first refractive index and some of the second films with the second refractive index which are films disposed at a first side of the middle film, and a second group consisted of another some of the first films with the first refractive index and another some of the second films with the second refractive index which are films disposed at a second side of the middle film, and the first side is opposite to the second side.

In some embodiments, films in the first group and films in the second group are disposed asymmetrically relative to the middle film; an optical thickness and/or a refractive index of each film in the first group is different from that of a film in the second group at an opposite position in relation to the middle film.

In some embodiments, films in the first group and films in the second group are disposed symmetrically relative to the middle film, where an optical thickness or a refractive index of each film in the first group is same to that of a film in the second group at an opposite position in relation to the middle film.

In some embodiments, film characteristics of films in the multilayer film are: a1H a2L a3H a4L . . . a4L a3H a2L a1H, where represents a first film with the high refractive index, and having a standard optical thickness of ¼ $\lambda_L$; a1, a2, a3, a4 . . . L represents a second film with the low refractive index, and having a standard optical thickness of ¼ $\lambda_L$; a1, a2, a3, a4 . . . are coefficients; wherein a2, a3, a4, . . . are in a range from about 0.1 to about 5 respectively, and a1 is 0 or in a range from about 0.1 to about 5.

In some embodiments, a second film with a minimum optical thickness in the second films with the second refractive index, has an optical thickness larger than that of a first film with a maximum optical thickness in the first films with the first refractive index, and the first refractive index is larger than the second refractive index.

In some embodiments, none of a1, a2, a3, a4 . . . , equals to 1.

In some embodiments, a1, a2, a3, a4 . . . , are all different from each other.

In some embodiments, the optical film is configured to form a structural color to produce a high reflection in a certain light spectrum range. The high reflection is obtained in an ultraviolet range being larger than about 1.80 nm and smaller than about 380 nm, or in a visible range being larger than about 380 nm and smaller than about 780 nm, or in a near-infra-red range being larger than about 780 nm and smaller than about 2800 mm.

In some embodiments, the first films with the first refractive index have optical thicknesses in a range of equal to or greater than 30 nm and equal to or smaller than 1000 nm; the second films with the second refractive index have optical thickness in a range of equal to or greater than 40 nm and equal to or smaller than 1000 nm, and the first refractive index is larger than the second refractive index; and/or, the total number of films in the optical film is in a range from about 3 to about 30.

In some embodiments, the middle film is one of the first films with the first refractive index or one of the second films with the second refractive index.

In some embodiments, the middle film is made of a material of a single element or a compound; wherein the single element is selected from a group comprising at least carbon, silicon, germanium, aluminum, nickel, titanium, chromium, tungsten, gold, silver, platinum, and palladium; the compound is from a group comprising at least one of oxide, fluoride, sulfide, hydroxide, nitride, carbide, and chloride.

In some embodiments, the total number of the films in the optical film is 7; the optical film is a red-hue structural color; the films of the structural color from a first layer to a seventh layer sequentially in a stacking direction, are respectively: a first-refractive-index film with an optical thickness of about 90 to about 315 nm, a second-refractive-index film with an optical thickness of about 70 to about 220 nm, a first-refractive-index film with an optical thickness of about 67 to about 270 nm, a second-refractive-index film with an optical thickness of about 130 to about 260 nm, first-refractive-index film with an optical thickness of about 67 to about 270 nm, a second-refractive-index film with an optical thickness of about 70 to about 220 nm, a first-refractive-index film with an optical thickness of about 90 to about 315 nm; or, the optical film is a green-hue structural color; the films of the structural color from a first layer to a seventh layer sequentially in a stacking direction, are respectively: a first-refractive-index film with an optical thickness of about 270 to about 450 nm, a second-refractive-index film with an optical thickness of about 340-about 460 nm, a first-refractive-index film with an optical thickness of about 315 to about 490 nm, a second-refractive-index film with an optical thickness of about 333 to about 450 nm, a first-refractive-index film with an optical thickness of about 315 to about 490 nm, a second-refractive-index film with an optical thickness of about 340 to about 460 nm, and a first-refractive-index film with an optical thickness of about 270 to about 450 nm; or, the optical film is a blue-hue structural color; the films of the structural color from a first layer to a seventh layer sequentially in a stacking direction, are respectively: a first-refractive-index film with an optical thickness of about 60 to about 230 nm, a second-refractive-index film with an optical thickness of about 40 to about 220 nm, a first-refractive-index film with an optical thickness of about 60 to about 230 nm, a second-refractive-index film with an optical thickness of about 40 to about 180 nm, a first-refractive-index film with an optical thickness of about 60 to about 230 nm, second-refractive-index film with an optical thickness of about 40 to about 220 nm, a first-refractive-index film with an optical thickness of about 60 to about 230 nm.

In some embodiments, all the films in the optical film are made of materials of dielectric compounds; the plurality of first films with the first refractive index are made of material groups including oxides or sulfides; the oxides include at least one of groups including titanium oxide, zirconia, aluminum oxide, tantalum oxide, and hafnium oxide; the sulfides include zinc sulfide; the plurality of second films with the second refractive index are made of material groups including at least one of groups including silicon oxide, magnesium fluoride, calcium fluoride, and sodium hexafluoride aluminate.

In some embodiments, the optical film further includes a substrate made of glass, plastic, or metal, wherein the substrate covers at least one outermost film in a stacking direction.

The present disclosure provides a structural colored pigment, formed from fragments of the an optical film described above, wherein, the optical film includes: a multilayer film, including a plurality of first films with a first refractive index and a plurality of second films with a second refractive index alternately arranged in a multilayer structure, wherein the multilayer film further includes a middle film; wherein the middle film and films disposed at a same side of the middle film and having a same refractive index, have optical thicknesses which are all different or partially different; the number of films of each of the fragments and the number of all the films in the optical film are the same; optical properties of the films of each of the fragments are the same as optical properties of the optical film.

In some embodiments, the structural colored pigment is capable of being physically mixed with a viscous solution according to a preset mass ratio and stirred uniformly, thereby obtaining a coating containing the structural colored pigment, the viscous solution including an optical epoxy adhesive.

The present disclosure provides a method for preparing an optical film configured to form a structural colored pigment, wherein the method includes: forming an optical film on a substrate, wherein the optical film includes a multilayer film, including a plurality of first films with a first refractive index and a plurality of second films with a second refractive index alternately arranged in a multilayer structure, wherein the multilayer film further includes a middle film; wherein the middle film and films disposed at a same side of the middle film and having a same refractive index, have optical thicknesses which are all different or partially different.

In some embodiments, the forming an optical film on a substrate includes: forming a plurality of multilayer films on the substrate by vacuum evaporation, and monitoring optical thicknesses of films being formed, such that the optical thicknesses meet the requirements.

In some embodiments, operations after the forming an optical film on a substrate include: peeling the optical film from the substrate, wherein the optical film is entirely placed into a solvent to perform a film removing treatment; and operations before the forming an optical film on a substrate include: a layer of a release agent is coated on a surface of the substrate.

BRIEF DESCRIPTION OF THE DRAWINGS

To further illustrate technical solutions of embodiments of the present disclosure, drawings needed for description of the embodiments will be briefly introduced. Obviously, the following drawings are only representatives of some embodiments of the present disclosure. To any one of skill in the art, other drawings may be obtained without any creative work based on the following drawings.

DETAILED DESCRIPTION

Referring to the accompanying drawings in embodiments of the present disclosure, the following will be a clear and complete description of the technical solutions in the present disclosure. It is clear that the described embodiments are only part of the embodiments of the present disclosure, but not all of them. Based on the embodiments in the present disclosure, all other embodiments obtained by those with ordinary skills in the art without making inventive labor are within the scope of the present disclosure.

Structural colored pigments based on optical films can currently be divided into two categories: chameleon-like pigments (i.e. angle-dependent color) and omnidirectional pigments. The chameleon pigments have different colors when viewed at different angles, for example, patterns of "100" printed on RMB banknotes. The omnidirectional pigments have similar colors and small changes when viewed at different angles.

The principle of the structural color is based on optical interference effect. When an incident light arrives on the optical film and encounters a first layer interface, part of the incident light is reflected back at a certain angle, while the other part of the incident light is refracted. When the refracted light encounters a second layer interface, the refracted light is reflected to the first layer interface at another angle, intensity and phase, and further refracted. Therefore the color of the reflected light varies with the number, the thickness, and the refractive index of the films, and is determined by the constructive or destructive interference of light in a certain band.

Figure 1:
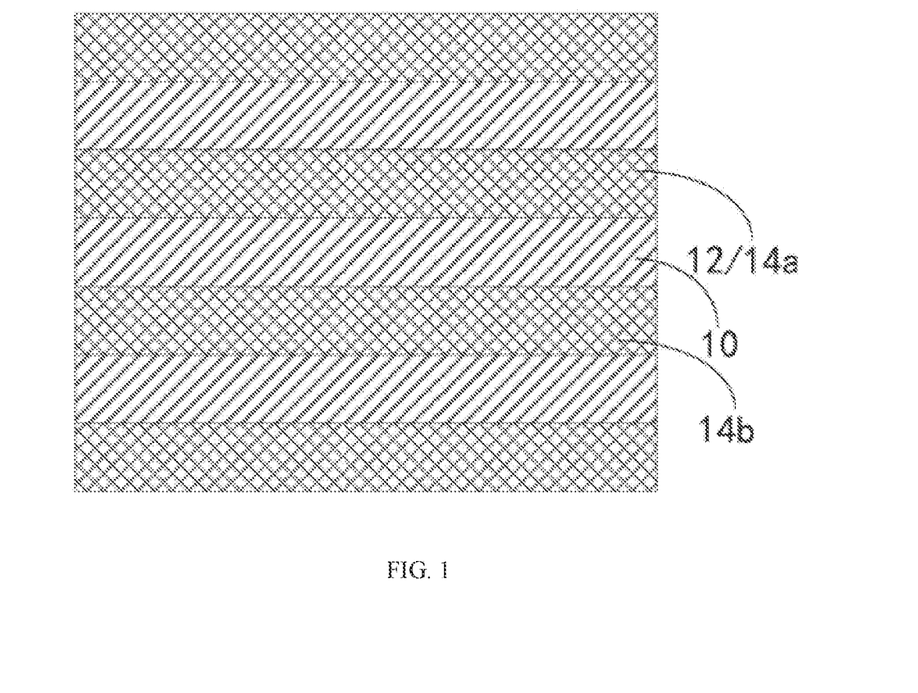
FIG. 1 is a structural schematic view of an optical film according to an embodiment of the present disclosure.

Referring to FIG. 1, FIG. 1 is a structural schematic view of an optical film according to an embodiment of the present disclosure. The optical film is configured to form a structural colored pigment. The optical film includes: a multilayer film in which films with high refractive indexes and films with low refractive indexes are alternately arranged in a multilayer structure. The multilayer film includes a middle film 10. The number of films in the multilayer film is odd and may be 3-30, for example, 3, 5, 7, 9, etc. The films with various refractive indexes may be arranged in an order of high refractive index-low refractive index-high refractive index, or low refractive index-high refractive index-low refractive index. Other films 12 refer to a combination of films disposed on a side of the middle film 10. According to the embodiments, in the optical film, the optical thicknesses of the films having a same refractive index in the other films 12 and the optical thickness of the middle film 10 are different. For example, in the optical film, when the total number of films with a high refractive index in the other films 12 and the middle film 10 is equal to or greater than 2, the optical thicknesses of the films with the high refractive index are different. Similarly, when the total number of films with a low refractive index in the other films 12 and the middle film 10 is equal to or greater than 2, the optical thicknesses of the films with the low refractive index are different. Of course, in the optical film, the optical thicknesses of the films having a same refractive index in the other films 12 and the optical thickness of the middle film 10 may not be exactly the same. For example, when the total number of films with the high refractive index in the other films 12 and the middle film 10 is 3, the optical thicknesses of two films of the films with the high refractive index are the same. Similarly, when the total number of films with the low refractive index in the other films 12 and the middle film 10 is 3, the optical thicknesses of two films of the films with the low refractive index are the same.

In the optical film, the optical thicknesses of the films having a same refractive index in the other films 12 and the optical thickness of the middle film 10 may be different or not be exactly the same. In this way, the structure of the optical film may be more diverse and colors may be more vibrant.

Or to say, the embodiments provide a multilayer film including a plurality of first films with a first refractive index and a plurality of second films with a second refractive index alternately arranged in a multilayer structure. The multilayer film further includes a middle film 10. The middle film 10 and films disposed at a same side of the middle film and having a same refractive index, have optical thicknesses which are all different or partially different. The plurality of first films and the second films constitute the other films on both sides. The other films may also be divided into a first group consisted of some of the first films with the first refractive index and some of the second films with the second refractive index which are films disposed at a first side of the middle film 10, and a second group consisted of another some of the first films with the first refractive index and another some of the second films with the second refractive index which are films disposed at a second side of the middle film 10. The first side is opposite to the second side.

In some embodiments, the other films on both sides of the middle film 10 may be disposed asymmetrically relative to the middle film 10. The optical thickness and/or the refractive index of the films at corresponding positions on both sides of the middle film 10 may be completely different. For example, as shown in FIG. 1, the optical thickness and/or the refractive index of the two first films 14a and 14b adjacent to the middle film 10 may be different. And so on, along stacking directions on both sides of the middle film 10, the optical thickness and/or the refractive index of the two films, such as the second, third . . . films adjacent to the middle film 10 in order may be different. In this way, two sides of the optical film may reflect different colors of light. When the optical film is crushed into flake particles and mixed, a composite color of two colors may be generated, thereby increasing a width of the color gamut. This method is an extremely effective and simple strategy for generating a third color.

In some embodiments, in the optical film, the optical thicknesses of the other films 12 and the optical thickness of the middle film 10 may be different, that is, the optical thicknesses of all the films in the optical film are different. In this way, the structure of the optical film may be more diverse and colors may be more vibrant.

In some embodiments, the other films on both sides of the middle film 10 may be symmetrically arranged relative to the middle film 10. In this way, a reflection effect of visible light may be increased, thus increasing the brightness of the optical film, and subsequently the brightness of the structural colored pigment made from the optical film. The optical film is expressed in a form as follows: $a_1H\ a_2La_3H\ a_4L\ \ldots\ a_4L\ a_3H\ a_2L\ a_1H$, where H represents a film with a high refractive index, and with an optical thickness of $\frac{1}{4}\lambda_H$; L represents a film with a low refractive index, and with an optical thickness of $\frac{1}{4}\lambda_L$; $a_1, a_2, a_3, a_4 \ldots$ are coefficients. The above $a_2, a_3, a_4$, etc. may range from 0.1 to 5, and the $a_1$ may range from 0, or 0.1 to 5. The optical thicknesses of the films $a_1, a_3 \ldots$ having a same refractive index in the other films 12 and the optical thickness of the middle film 10 may be different or not be exactly the same. Further, the optical thicknesses of all the films $a_1, a_2, a_3, a_4 \ldots$ in the other films 12 and the optical thickness of the middle film 10 are different. None of the $a_1, a_2, a_3, a_4 \ldots$ may not be 1.

In some embodiments, a minimum value of the optical thickness of the films with the low refractive index is greater than a maximum value of the optical thickness of the films with the high refractive index, such that costs may be further reduced.

In some embodiments, the optical thicknesses of the films with the high refractive index in the optical film are equal to or greater than 30 nm and equal to or smaller than 1000 nm (for example, 30 nm, 100 nm, 200 nm, 300 nm, 700 nm, 900 nm, etc.). The optical thicknesses of the films with the low refractive index in the optical film are equal to or greater than 40 nm and equal to or smaller than 1000 nm (for example, 40 nm, 150 nm, 250 nm, 400 nm, 800 nm, 1000 nm, etc.).

In some embodiments, the middle film 10 in the optical film is a low-refractive-index film, such that costs may be reduced compared with the middle film 10 being a high-refractive-index film. Of course, the middle film 10 may also be a high-refractive-index film. A material of the middle film 10 may be a single element or a compound. The single element includes at least one of groups including the following: carbon, silicon, germanium, aluminum, nickel, titanium, chromium, tungsten, gold, silver, platinum, and palladium. The compound includes at least one of groups including the following: oxides, fluorides, sulfides, hydroxides, nitrides, carbides, chlorides. The oxides may be silicon monoxide, silicon dioxide, titanium oxide, zirconia, alumina, tantalum oxide, hafnium oxide, etc. The fluorides may be magnesium fluoride, calcium fluoride, sodium hexafluoride, etc. The sulfides may be zinc sulfide, cadmium sulfide, etc. The hydroxides may be aluminum hydroxide, sodium hydroxide, potassium hydroxide, calcium hydroxide, etc. The nitrides may be potassium nitride, aluminum nitride, boron nitride, etc. The carbides may be silicon carbide, chromium carbide, etc. The chlorides may be sodium chloride, potassium chloride, calcium chloride, etc.

In some embodiments, the optical film is configured to form a structural color to produce a high reflection in a certain light spectrum range. The high reflection is obtained in an ultraviolet range being larger than about 180 nm and smaller than about 380 nm, or in a visible range being larger than about 380 nm and smaller than about 780 nm, or in a near-infra-red range being larger than about 780 nm and smaller than about 2800 nm.

When the total number of the films in the optical film is 7, the optical film is a red-hue structural color. The first to seventh layer of the structural color are respectively: a high-refractive-index film with an optical thickness of 90 to 315 nm (for example, 90 nm, 200 nm, 315 nm, etc.), a low-refractive-index film with an optical thickness of 70 to 220 nm (for example, 70 nm, 140 nm, 220 nm, etc.), a high-refractive-index film with an optical thickness of 67 to 270 nm (for example, 67 nm, 150 nm, 270 nm, etc.), a low-refractive-index film with an optical thickness of 130 to 260 nm (for example, 130 nm, 190 nm, 260 nm, etc.), a high-refractive-index film with an optical thickness of 67 to 270 nm (for example, 67 nm, 150 nm, 270 nm, etc.), a low-refractive-index film with an optical thickness of 70 to 220 nm (for example, 70 nm, 140 nm, 220 nm, etc.), a high-refractive-index film with an optical thickness of 90 to 315 nm (for example, 90 nm, 200 nm, 315 nm, etc.).

Or, the optical film is a green-hue structural color. The first to seventh layer of the structural color are respectively: a high-refractive-index film with an optical thickness of 270 to 450 nm (for example, 270 nm, 350 nm, 450 nm, etc.), a low-refractive-index film with an optical thickness of 340-460 nm (for example, 340 nm, 400 nm, 460 nm, e a high-refractive-index film with an optical thickness of 315 to 490 nm (for example, 315 nm, 400 nm, 490 nm, etc.), a low-refractive-index film with an optical thickness of 333 to 450 nm (for example, 333 nm, 395 nm, 450 nm, etc.), a high-refractive-index film with an optical thickness of 315 to 490 nm (for example, 315 nm, 400 nm, 490 nm, etc.), a low-refractive-index film with an optical thickness of 340 to 460 nm (for example, 340 nm, 400 nm, 460 nm, etc.), and a high-refractive-index film with an optical thickness of 270 to 450 nm (for example, 270 nm, 350 nm, 450 nm, etc.).

Or, the optical film is a blue-hue structural color. The first to seventh layer of the structural color are respectively: a high-refractive-index film with an optical thickness of 60 to 230 nm (for example, 60 nm, 150 nm, 230 nm, etc.), a low-refractive-index film with an optical thickness of 40 to 220 nm (for example, 40 nm, 130 nm, 220 nm, etc.), a high-refractive-index film with an optical thickness of 60 to 230 nm (for example, 60 nm, 150 nm, 230 nm, etc.), a low-refractive-index film with an optical thickness of 40 to 180 nm (for example, 40 nm, 110 nm, 180 nm, etc.), a high-refractive-index film with an optical thickness of 60 to 230 nm (for example, 60 nm, 150 nm, 230 nm, etc.), a low-refractive-index film with an optical thickness of 40 to 220 nm (for example, 40 nm, 130 nm, 220 nm, etc.), a high-refractive-index film with an optical thickness of 60 to 230 nm (for example, 60 nm, 150 nm, 230 nm, etc.).

It can be understood, that a high-refractive-index film can refer to a first-refractive-index film, and a low-refractive-index film can refer to a second-refractive-index film, where the first refractive index is larger than the second refractive index.

In some embodiments, the total number of the films in the optical film may also be 3, and four films immediately adjacent to both sides of the middle film 10 may be removed. Of course, the total number of the films in the optical film may also be 5. In this case, the two outermost films may be removed. The total number of the films in the optical film may also be 9. In this case, a film may be added to the outermost side of each side of the optical film respectively. Parameters such as the number of films, the material, the refractive index and the thickness of each film may be set according to actual situations, to fully improve the adaptability and wide application of the optical film.

In some embodiments, a difference between the refractive indexes of the high-refractive-index film and the low-refractive-index film is equal to or greater than 0.2, for example, 0.2, 0.4, 0.9, and the like. In this way, the obtained optical film may have a better brightness and a better color vividness, and a reflectivity of the obtained optical film is equal to or greater than 80%, such that the brightness of the optical film is further higher.

In the embodiments, the material of the films in the optical film is a compound, and the does not include elemental metals, which can reduce environmental pollution and reduce costs. In addition, since the compound does not absorb light, the reflectivity to light may approach 100%. Therefore, the brightness and the color vividness may be further improved. The material of the high-refractive-index films may include an oxide or a sulfide. The oxide includes at least one of groups including titanium oxide, zirconia, aluminum oxide, tantalum oxide, and hafnium oxide. The sulfide includes zinc sulfide. The material of the low-refractive-index films may include at least one of groups including silicon oxide, magnesium fluoride, calcium fluoride, and sodium hexafluoride aluminate.

In the embodiments, the optical film provided in the present disclosure may further include a substrate. The substrate may be made of glass, plastic, metal, or the like, and may cover at least one of the outermost films in the stacking directions. That is, the structure of the optical film may be substrate-multilayer film, or substrate-multilayer film-substrate.

The present disclosure also provides a structural colored pigment. The structural colored pigment is made of fragments of the optical film in any of the above embodiments. The number of films of each fragment is the same as the number of films of the optical film. Optical properties of the films of each fragment are the same as those of the optical film.

In some embodiments, the optical film may be formed into micron-sized fragments by an ultrasonic pulverization method to obtain a structural colored pigment.

Further, the obtained structural colored pigment may be physically mixed with a viscous solution according to a preset mass ratio and stirred uniformly, thereby obtaining a coating containing the structural colored pigment. The viscous solution may be an optical epoxy adhesive or the like. The mass of the structural colored pigments may range from 1% to 70% of the total mass of the coating, for example, 1%, 3%, 35%, 55%, 70%, etc.

Figure 2:
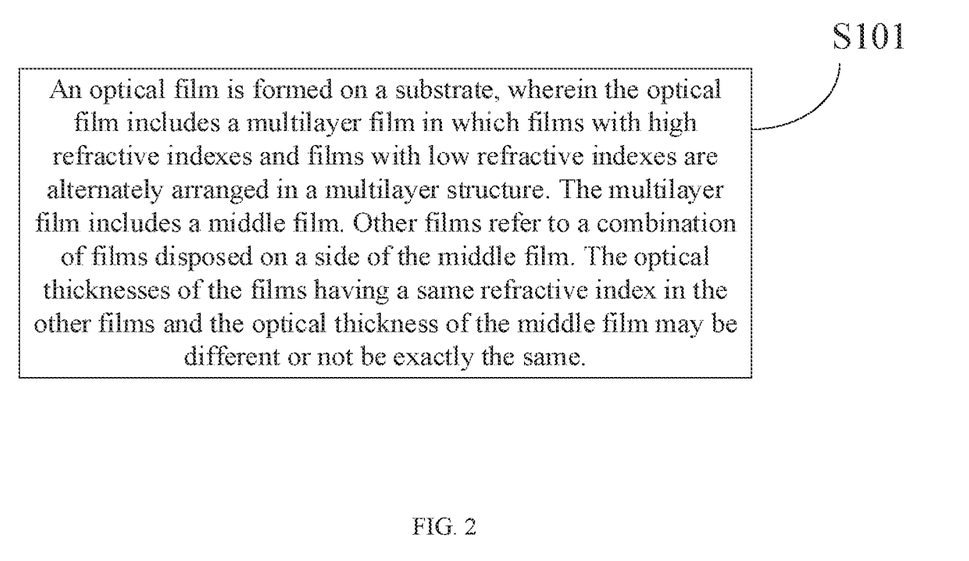
FIG. 2 is a schematic flowchart of a method for preparing an optical film according to an embodiment of the present disclosure.

Referring to FIG. 1 and FIG. 2. FIG. 2 is a schematic flowchart of a method for preparing an optical film according to an embodiment of the present disclosure. The method may include operations at blocks illustrated in FIG. 2.

At block S101: An optical film is formed on a substrate, wherein the optical film includes a multilayer film in which films with high refractive indexes and films with low refractive indexes are alternately arranged in a multilayer structure. The multilayer film includes a middle film 10. Other films 12 refer to a combination of films disposed on a side of the middle film 10. The optical thicknesses of the films having a same refractive index in the other films 12 and the optical thickness of the middle film 10 may be different or not be exactly the same.

Specifically, the substrate may be a transparent glass substrate, a polyethylene hard plastic, or the like. In addition, the implementation of the above S101 may be: sequentially forming a plurality of multilayer films on the substrate by vacuum evaporation or the like, and monitoring the optical thickness of the film being formed while forming, the film, such that a resulting optical thickness may meet the requirements.

In some embodiments, after the above S101, the preparation method provided in the present disclosure further includes: peeling the substrate. Specifically, before the above S101, a layer of a release agent (for example, sodium chloride, etc.) may be coated on a surface of the substrate. The above-mentioned process of peeling the substrate may be that the optical film formed in S101 is entirely placed into a peeling liquid to perform a film removing treatment.

Of course, in other embodiments, the substrate may not be peeled, which is not limited in the present disclosure.

Several specific embodiments will be given to further explain the optical film provided by the present disclosure.

Embodiment 1

The optical film includes 7 films, and the corresponding optical thickness and material of each layer are shown in Table 1 below. The material of the low-refractive-index films is $SiO_2$, and the material of the high-refractive-index films is $TiO_2$.

Color coordinates of the optical film obtained through detection by a color analyzer are: x: 0.15, y: 0.13. The color coordinates indicate that the optical film is a blue-hue structural color.

Figure 3:
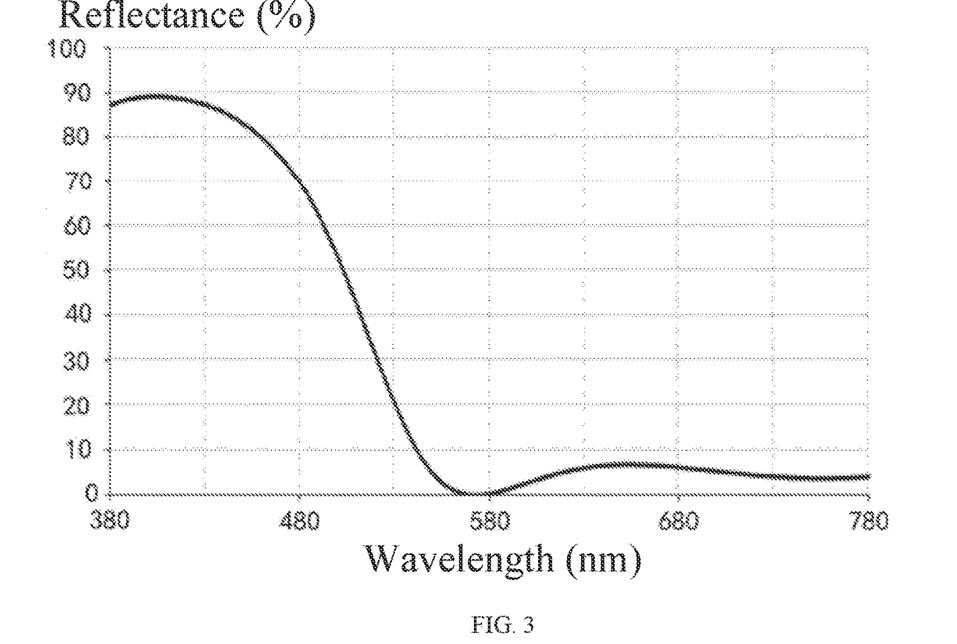
FIG. 3 is a schematic view of a spectroscopic curve of an optical film according to Embodiment 1 of the present disclosure.

A spectroscopic spectral curve of the optical film is obtained through detection by a spectroscopic spectrometer, as shown in FIG. 3. FIG. 3 is a schematic view of a spectroscopic curve of an optical film according to Embodiment 1 of the present disclosure. It can be seen that a maximum reflection wavelength is about 400 nm, indicating that the optical film is a blue-hue structural color, and a maximum reflectance is close to 90%.

TABLE 1

Material and optical thickness of each layer of the optical film

| | Material | Optical thickness (nm) |
|---|---|---|
| First layer | $TiO_2$ | 72 |
| Second layer | $SiO_2$ | 102 |
| Third layer | $TiO_2$ | 112 |
| Fourth (middle) layer | $SiO_2$ | 110 |
| Fifth layer | $TiO_2$ | 112 |
| Sixth layer | $SiO_2$ | 102 |
| Seventh layer | $TiO_2$ | 72 |

Embodiment 2

The optical film includes 7 films, and the corresponding optical thickness and material of each layer are shown in Table 2 below. The material of the low-refractive-index films is $SiO_2$, and the material of the high-refractive-index films is $TiO_2$.

Color coordinates of the optical film obtained through detection by a color analyzer are: x: 0.23, y: 0.49. The color coordinates indicate that the optical film is a green-hue structural color.

Figure 4:
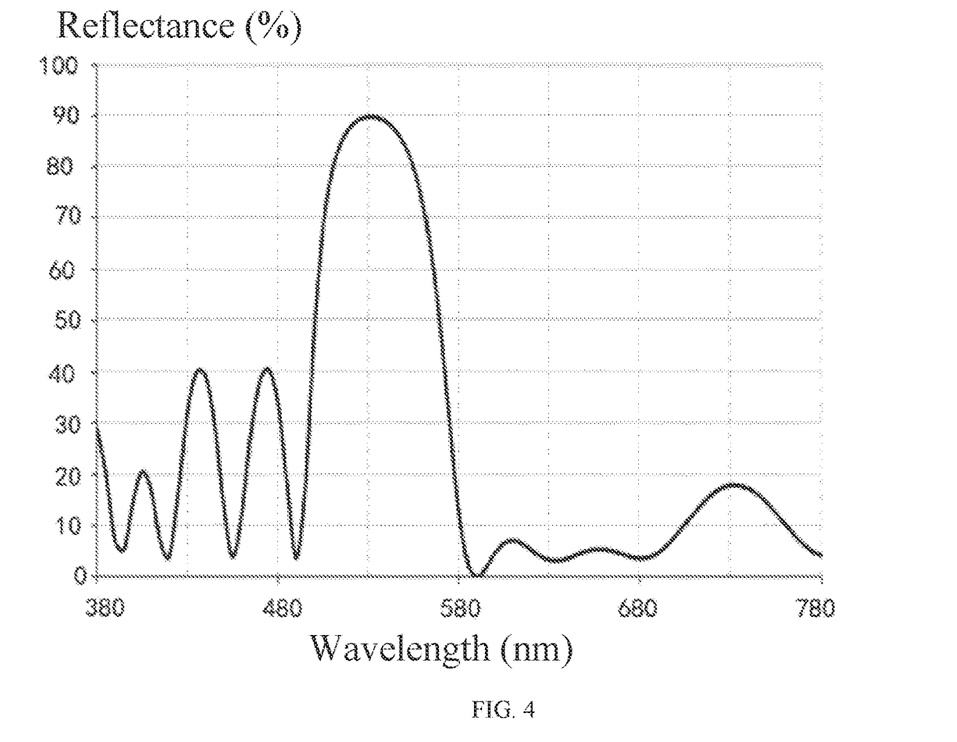
FIG. 4 is a schematic view of a spectroscopic curve of an optical film according to Embodiment 2 of the present disclosure.

A spectroscopic spectral curve of the optical film is obtained through detection by a spectroscopic spectrometer, as shown in FIG. 4. FIG. 4 is a schematic view of a spectroscopic curve of an optical film according to Embodiment 2 of the present disclosure. It can be seen that a maximum reflection wavelength is about 530 nm, indicating that the optical film is a green-hue structural color, and a maximum reflectance is close to 90%.

TABLE 2

Material and optical thickness of each layer of the optical film

| | Material | Optical thickness (nm) |
|---|---|---|
| First layer | $TiO_2$ | 364 |
| Second layer | $SiO_2$ | 407 |
| Third layer | $TiO_2$ | 414 |
| Fourth (middle) layer | $SiO_2$ | 390 |
| Fifth layer | $TiO_2$ | 414 |
| Sixth layer | $SiO_2$ | 407 |
| Seventh layer | $TiO_2$ | 364 |

Embodiment 3

The optical film includes 7 films, and the corresponding optical thickness and material of each layer are shown in Table 3 below. The material of the low-refractive-index films is $SiO_2$, and the material of the high-refractive-index films is $TiO_2$.

Color coordinates of the optical film obtained through detection by a color analyzer are: x: 0.54, y: 0.29. The color coordinates indicate that the optical film is a red-hue structural color.

Figure 5:
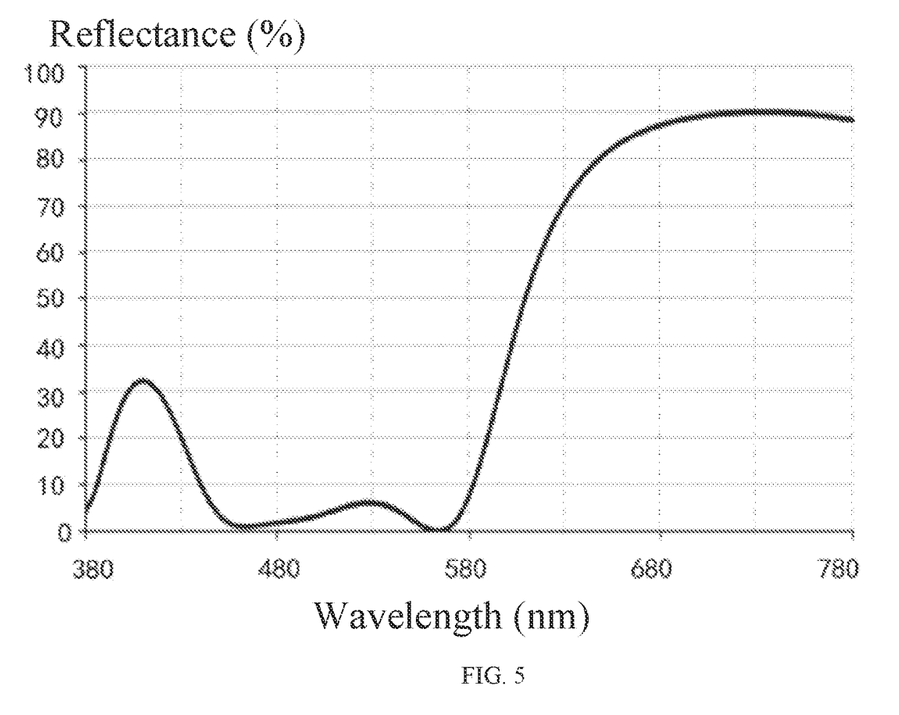
FIG. 5 is a schematic view of a spectroscopic curve of an optical film according to Embodiment 3 of the present disclosure.

A spectroscopic spectral curve of the optical film is obtained through detection by a spectroscopic spectrometer, as shown in FIG. 5. FIG. 5 is a schematic view of a spectroscopic curve of an optical film according to Embodiment 2 of the present disclosure. It can be seen that a maximum reflection wavelength is about 730 nm, indicating that the optical film is a red-hue structural color, and a maximum reflectance is close to 90%.

TABLE 3

Material and optical thickness of each layer of the optical film

|  | Material | Optical thickness (nm) |
|---|---|---|
| First layer | $TiO_2$ | 223 |
| Second layer | $SiO_2$ | 162 |
| Third layer | $TiO_2$ | 171 |
| Fourth (middle) layer | $SiO_2$ | 194 |
| Fifth layer | $TiO_2$ | 171 |
| Sixth layer | $SiO_2$ | 162 |
| Seventh layer | $TiO_2$ | 223 |

The above description is for the purpose of illustrating implementations of the present disclosure, but not to limit the scope of the present disclosure. Any equivalent structural or process transformation performed based on the drawings and the specification of the present disclosure, applied directly and indirectly in other related art, should be within the scope of the present disclosure.

What is claimed is:

1. An optical film, comprising:
a multilayer film, comprising a plurality of first films with a first refractive index and a plurality of second films with a second refractive index alternately arranged in a multilayer structure, wherein the multilayer film further comprises a middle film as a middle film layer;
wherein the middle film and films disposed at a same side of the middle film having a same refractive index, have optical thicknesses that are all different or partially different; film characteristics of films in the multilayer film are: $a_1H\ a_2L\ a_3H\ a_4L\ \ldots\ a_4L\ a_3H\ a_2L\ a_1H$; where H represents a typical first film with the first refractive index, and having a standard optical thickness of ¼ $\lambda_H$; L represents a typical second film with the second refractive index, and having a standard optical thickness of ¼ $\lambda_L$; the first refractive index is greater than the second refractive index; $a_1, a_2, a_3, a_4 \ldots$ are coefficients; $a_2, a_3, a_4, \ldots$ are in a range from about 0.1 to about 5 respectively, and $a_1$ is 0 or in a range from about 0.1 to about 5; and
the multilayer film comprises a first layer, a second layer, a third layer, a fourth layer, a fifth layer, a sixth layer, and a seventh layer stacked on each other; a material of each of the second layer, the fourth layer, and the sixth layer is $SiO_2$; a material of each of the first layer, the third layer, the fifth layer, and the seventh layer is $TiO_2$; and the optical thickness of the first layer to the seventh layer is 72 nm, 102 nm, 112 nm, 110 nm, 112 nm, 102 nm, and 72 nm, respectively.

2. The optical film according to claim 1, wherein, the difference between the first refractive index and the second refractive index is equal to or greater than 0.2.

3. The optical film according to claim 1, wherein, the multilayer film comprises a first group consisting of some of the first films with the first refractive index and some of the second films with the second refractive index which are films disposed at a first side of the middle film, and a second group consisted of another some of the first films with the first refractive index and another some of the second films with the second refractive index which are films disposed at a second side of the middle film, and the first side is opposite to the second side.

4. The optical film according to claim 3, wherein, films in the first group and films in the second group are disposed symmetrically relative to the middle film, the optical thickness or refractive index of each film in the first group is same to that of a film in the second group at an opposite position in relation to the middle film.

5. The optical film according to claim 1, wherein a second film with a minimum optical thickness in the second films with the second refractive index, has an optical thickness larger than that of a first film with a maximum optical thickness in the first films with the first refractive index, and the first refractive index is larger than the second refractive index.

6. The optical film according to claim 1, wherein none of $a_1, a_2, a_3, a_4 \ldots$, is equal to 1.

7. The optical film according to claim 1, wherein $a_1, a_2, a_3, a_4 \ldots$, are all different with each other.

8. The optical film according to claim 1, configured to form a structural color to produce a high reflection in a certain light spectrum range; wherein the high reflection is obtained in an ultraviolet range being larger than 180 nm and smaller than 380 nm, or in a visible range being larger than 380 nm and smaller than 780 nm, or in a near-infra-red range being larger than 780 nm and smaller than 2800 nm.

9. The optical film according to claim 1, wherein, the optical film is a blue-hue structural color.

10. The optical film according to claim 1, further comprising a substrate made of glass, plastic, or metal, wherein the substrate covers at least one outermost film in a stacking direction.

11. A structural colored pigment, formed from fragments of an optical film, wherein,
the optical film comprises:
a multilayer film, comprising a plurality of first films with a first refractive index and a plurality of second films with a second refractive index alternately arranged in a multilayer structure, wherein the multilayer film further comprises a middle film;
wherein the middle film and films disposed at a same side of the middle film and having a same refractive index, have optical thicknesses which are all different or partially different; film characteristics of films in the multilayer film are: $a_1H\ a_2L\ a_3H\ a_4L\ \ldots\ a_4L\ a_3H\ a_2L\ a_1H$; where H represents a typical first film with the first refractive index, and having a standard optical thickness of ¼ $\lambda_H$; L represents a typical second film with the second refractive index, and having a standard optical thickness of ¼ $\lambda_L$; the first refractive index is greater than the second refractive index; $a_1, a_2, a_3, a_4 \ldots$ are coefficients; and $a_2, a_3, a_4, \ldots$ are in a range from about 0.1 to about 5 respectively, and $a_1$ is 0 or in a range from about 0.1 to about 5;
the multilayer film comprises a first layer, a second layer, a third layer, a fourth layer, a fifth layer, a sixth layer, and a seventh layer stacked on each other; a material of each of the second layer, the fourth layer, and the sixth layer is $SiO_2$; a material of each of the first layer, the third layer, the fifth layer, and the seventh layer is $TiO_2$; and the optical thickness of the first layer to the seventh layer is 223 nm, 162 nm, 171 nm, 194 nm, 171 nm, 162 nm, and 223 nm, respectively; and a maximum reflectance of the optical film is 90%; and
the number of films of each of the fragments is the same as the number of the films in the optical film; and optical properties of the films of each of the fragments are the same as optical properties of those in the optical film.

12. The structural colored pigment according to claim 11, wherein, the structural colored pigment is capable of being physically mixed with a viscous solution according to a preset mass ratio and stirred uniformly, thereby obtaining a paint containing the structural colored pigment, the viscous solution comprising an optical epoxy adhesive.

13. The structural colored pigment according to claim 11, wherein the optical film is a red-hue structural color.

14. An optical film, comprising:

a multilayer film, comprising a plurality of first films with a first refractive index and a plurality of second films with a second refractive index alternately arranged in a multilayer structure, wherein the multilayer film further comprises a middle film as a middle film layer;

wherein the middle film and films disposed at a same side of the middle film having a same refractive index, have optical thicknesses that are all different or partially different; film characteristics of films in the multilayer film are: $a_1H\ a_2L\ a_3H\ a_4L\ \ldots\ a_4L\ a_3H\ a_2L\ a_1H$; where H represents a typical first film with the first refractive index, and having a standard optical thickness of $\frac{1}{4}\lambda_H$; L represents a typical second film with the second refractive index, and having a standard optical thickness of $\frac{1}{4}\lambda_L$; the first refractive index is greater than the second refractive index; $a_1, a_2, a_3, a_4\ \ldots$ are coefficients; $a_2, a_3, a_4, \ldots$ are in a range from about 0.1 to about 5 respectively, and $a_1$ is 0 or in a range from about 0.1 to about 5;

the multilayer film comprises a first layer, a second layer, a third layer, a fourth layer, a fifth layer, a sixth layer, and a seventh layer stacked on each other; a material of each of the second layer, the fourth layer, and the sixth layer is $SiO_2$; a material of each of the first layer, the third layer, the fifth layer, and the seventh layer is $TiO_2$; and the optical thickness of the first layer to the seventh layer is 364 nm, 407 nm, 414 nm, 390 nm, 414 nm, 407 nm, and 364 nm, respectively.

15. The optical film according to claim 14, wherein the optical film is a green-hue structural color.

16. The optical film according to claim 14, further comprising a substrate made of glass, plastic, or metal, wherein the substrate covers at least one outermost film in a stacking direction.

* * * * *